United States Patent [19]
Goldenfeld et al.

[11] Patent Number: 4,759,418
[45] Date of Patent: Jul. 26, 1988

[54] WHEELCHAIR DRIVE

[76] Inventors: Ilia V. Goldenfeld, 14/16 Rehov Meir Nakar; Yehezkel Mautner, Hamapilim Street 18; Eduard Mastov, Rivka Street, 5a/3, all of, Jerusalem, Israel

[21] Appl. No.: 17,053

[22] Filed: Feb. 20, 1987

[30] Foreign Application Priority Data

Feb. 24, 1986 [IL] Israel ........................................ 77966

[51] Int. Cl.[4] .............................................. B62D 61/00
[52] U.S. Cl. .................................... 180/65.1; 180/907
[58] Field of Search ............................... 180/65.1, 907

[56] References Cited

U.S. PATENT DOCUMENTS 3,794,132 2/1974 Moon ................................ 180/65.1
4,323,133 4/1982 Williams ............................ 180/65.1

*Primary Examiner*—Richard A. Bertsch

[57] ABSTRACT

An electric drive attachment for a wheelchair. The drive includes an electric motor constituting the input member of the drive, a wheel adapted to touch the ground and to drive the wheelchair by frictional contact with the ground, the wheel constituting the output member of said drive and speed-reducing means interposed between the input member and the output member. The input member, the speed-reducing means and the output member are mounted on a common mounting member attachable to the wheelchair, and means are provided to cause the common mounting member to selectively assume a first position in which the output member is in contact with the ground, and at least one second, non-contact position, in which the output member is lifted off the ground.

11 Claims, 5 Drawing Sheets

WHEELCHAIR DRIVE

The present invention relates to an electric drive attachment for a wheelchair for persons incapable of walking, in particular for persons having temporarily or permanently lost the use of their legs.

Wheelchairs used today are of two different types: the folding wheelchair, manually driven with the aid of hand rims concentric with the rear wheels of the chair, and the so-called power chair, which is electrically driven, being powered by a storage battery.

While light (16–24 kg) and relatively inexpensive, the manually driven wheelchair suffers from several disadvantages: its use requires continuous activity of the user's arms and hands, which cannot be rested during travel. The physical effort involved is thus considerable and significantly limits feasible travel distances, even with the aid of an attendant or companion. This problem is especially acute on inclined stretches of road, on ramps, and the like.

Power chairs, on the other hand, are very expensive and heavy (100 kg and more), are not foldable and, for journeys, require vans with special wheelchair lifts. They cannot be driven manually and if the battery gives out in midtravel, the wheelchair is stuck. For the same reason, they do not facilitate exercising of the active muscles left to, for instance, the paraplegic (arms, hands, back, chest, abdominal) and, finally, they are prone to frequent breakdowns, especially of their electrical and/or electronic components, and require constant maintenance and servicing.

It is one of the objects of the present invention to overcome the disadvantages, while retaining the respective advantages, of prior-art wheelchairs, and to provide a relatively inexpensive attachment to a standard foldable wheelchair of any make that renders the chair both manually and power-drivable.

This the invention achieves by providing an electric drive attachment for a wheelchair, comprising:

an electric motor constituting the input member of said drive;

a wheel adapted to touch the ground and to drive said wheelchair by frictional contact with said ground, said wheel constituting the output member of said drive;

speed-reducing means interposed between said input member and said output member;

wherein said input member, said speed-reducing means and said output member are mounted on a common mounting member attachable to said wheelchair, means being provided to cause said common mounting member to selectively assume a first position in which said output member is in contact with said ground, and at least one second, non-contact position, in which said output member is lifted off said ground.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
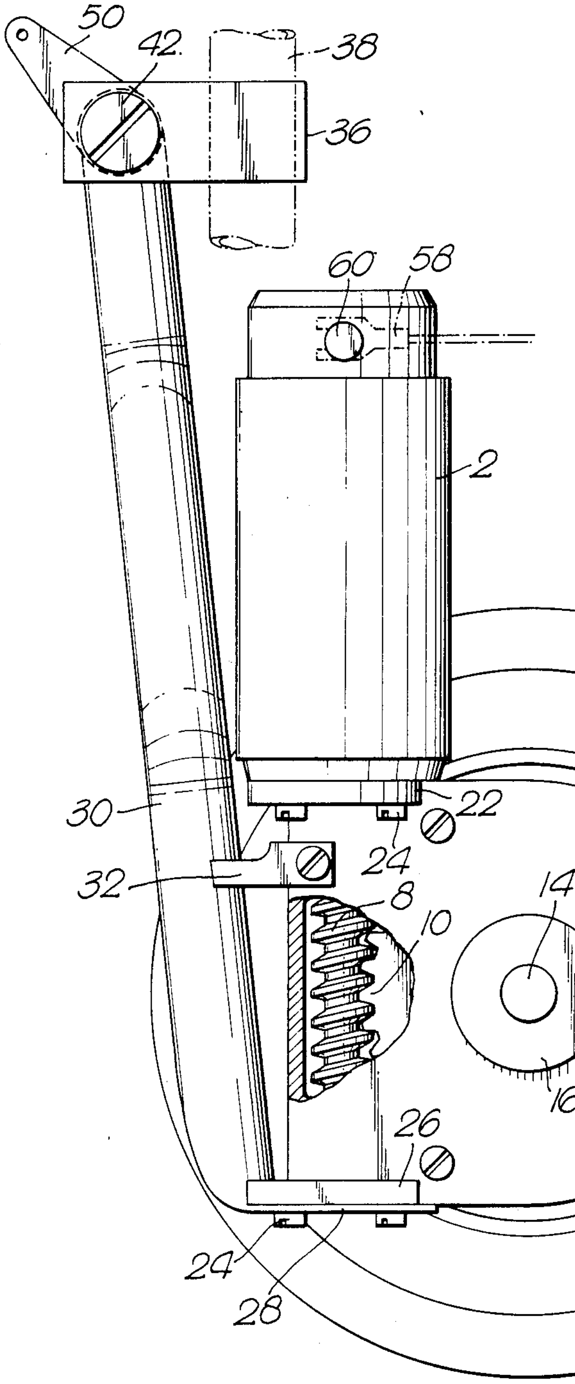
FIG. 1 is a side view of a preferred embodiment of the attachment according to the invention.

Referring now to the drawings, there is shown in FIGS. 1 to 4 a preferred embodiment of the attachment according to the invention, seen to consist of an electric motor 2, a speed reducer 4 and a drive wheel 6 which, in a manner to be explained in detail further below, is adapted to touch the ground and thus drive the wheelchair by frictional contact with this ground.

The motor 2 used is a D.C. motor, advantageously of the permanent-magnet type and operates to good effect on 36V. The motor is hermetically sealed and thereby protected against penetration of dust and other abrasive particles. This allows use of a very narrow air gap, resulting in extremely high flux densities of the magnetic field provided by strontium ferrite ceramic magnets. The commutators are diamond-turned after assembly of the armature, to ensure optimum concentricity and long brush life. Brushes are of the silver-graphite type. All these features combine to produce a motor with an unusually high efficiency of about 88% which, at a dissipated power of 25W, generates an active power of about 175W, enough to move a load of 100 kg up a gradient of 10% at a speed of about 3 km/h.

Rotor speed of 4755 rpm is reduced at a ratio of 1:40 by a speed reducer 4 which, in this embodiment has the form of a worm gear consisting of a worm 8 fixedly attached to the motor shaft (not shown) and a worm wheel 10, both accommodated in a split housing 12. The worm 8 in this embodiment is of the single-start thread type and is self-locking, i.e., the speed reducer 4 can be driven only through the worm 8, never through the wheel 10. The implications of this fact will be discussed further below.

Figure 3:
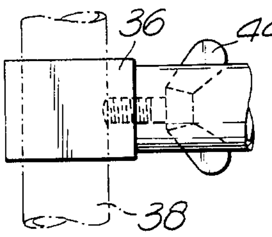
FIG. 3 is a rear view of the attachment of FIG. 1.
Figure 3:
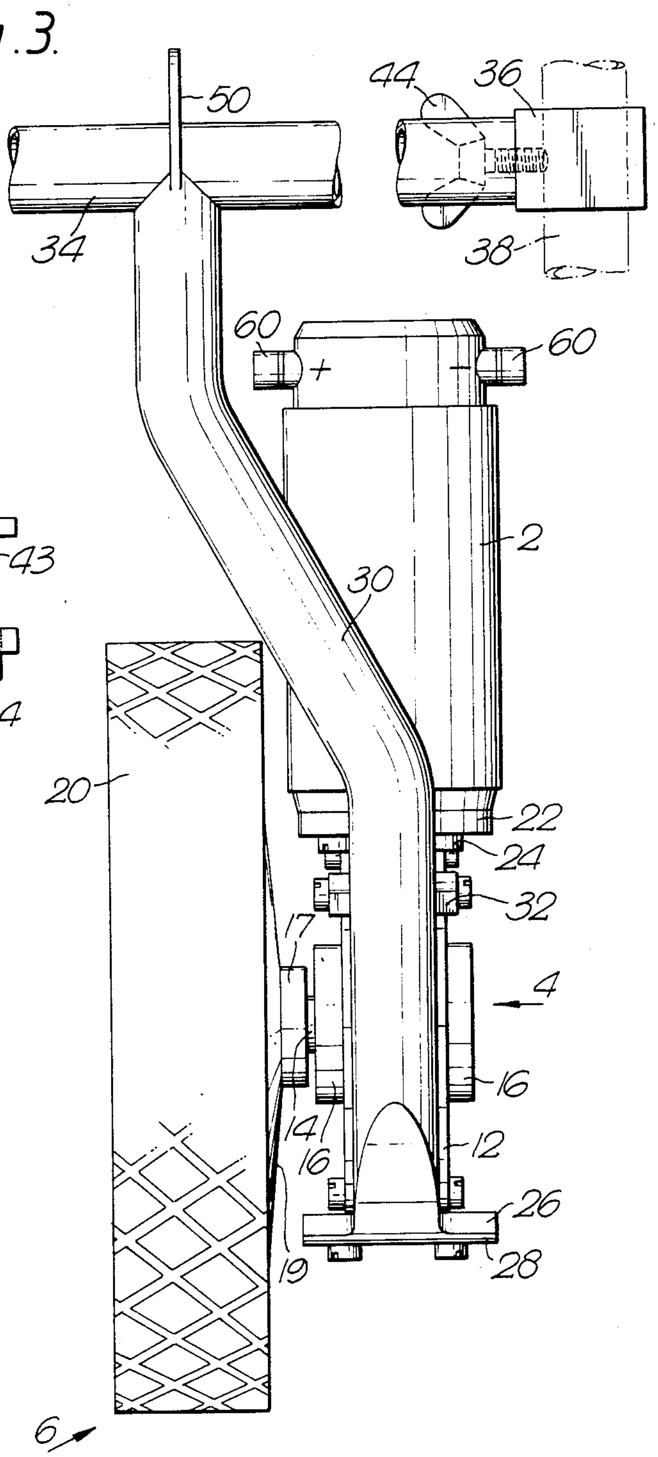
Figure 4:
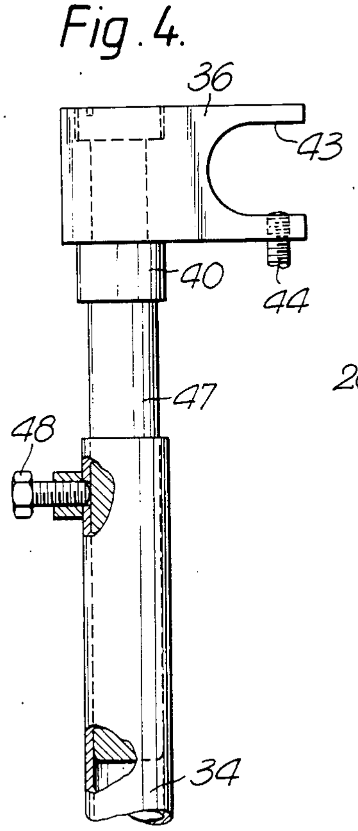
FIG. 4 is a view, in partial cross section, of a telescoping suspension tube.

The worm wheel 10 is keyed to a shaft 14 mounted in ball bearings (not shown) accommodated in central portions 16 of the split housing 12, and projects from the housing 12 on one side thereof, as clearly seen in FIG. 3.

To this overhanging portion of the shaft 14 is firmly keyed the metal hub 17 of the drive wheel 6 (see FIG. 3), with which hub is integral a wheel disk 19 carrying a rubber tire 20 with a tread patterned for better road grip.

The split housing 12 is also provided with two flanges, an upper flange 22, to which is ridingly attached the motor 2 by means of mounting screws 24, and a lower flange 26 which serves to mount the motor/reducer unit 2/4 on a plate 28, using another set of mounting screws 24.

This plate 28 constitutes the lower end of a tubular carrier 30, seen to better advantage in FIG. 3. A further element providing a rigid joint between the housing 12 and the carrier 30 is a bracket 32, one end of which is brazed or welded to the tubular carrier 30 and the other one secured to the housing 12 by screws.

Figure 5:
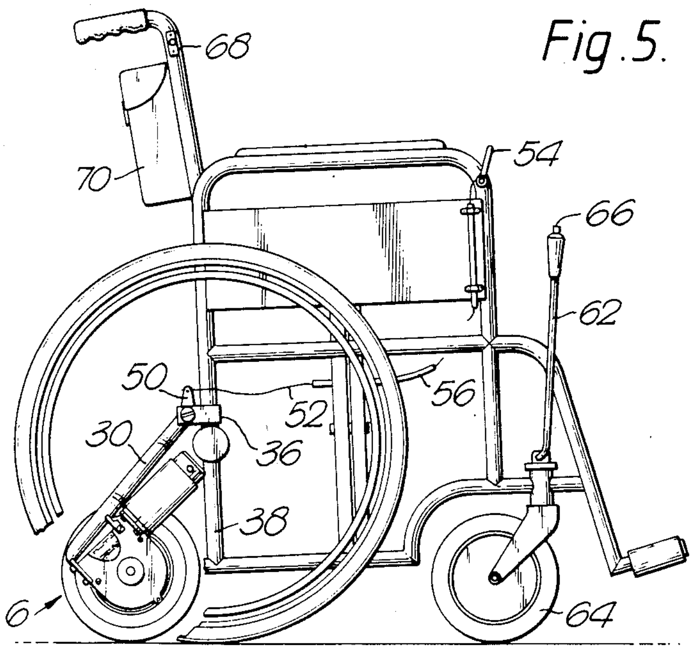
FIG. 5 shows a wheelchair with the attachment according to the invention, with the friction wheel contacting the ground for power driving.
Figure 6:
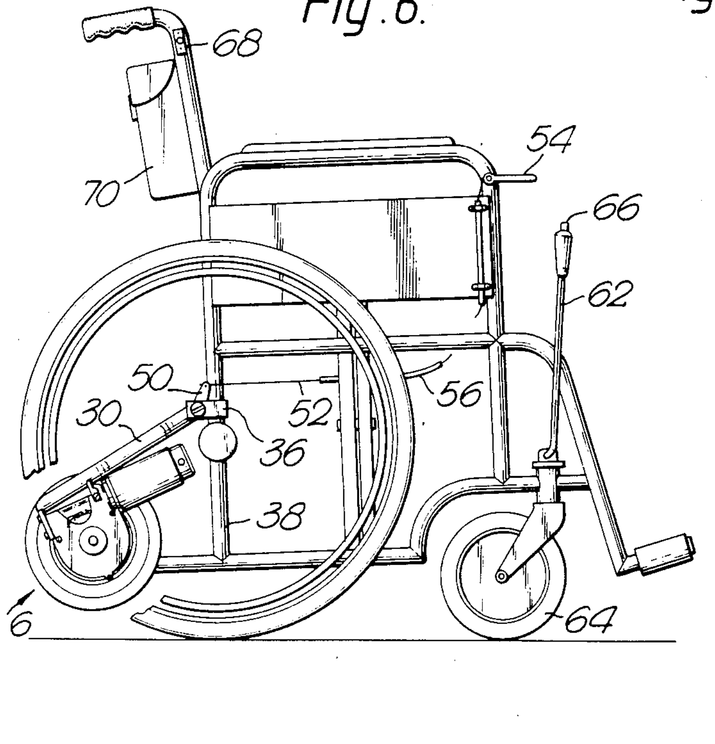
FIG. 6 shows the wheelchair of FIG. 5 with the friction wheel lifted off the ground for manual driving.

The upper end of the carrier 30 is brazed or welded to a cross member 34 which, on each of its ends, carries a clamping block 36, with the aid of which the cross member 34 is attached to the uprights 38 that are structural members of every type of wheelchair (see also FIGS. 5 and 6).

Figure 2:
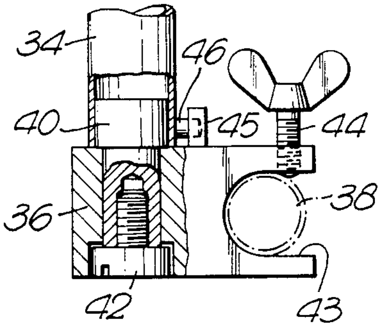
FIG. 2 is a top view, in partial cross section, of one of the suspension clamps of the attachment of FIG. 1.

The connection between the cross member 34 and the blocks 36 is illustrated in FIG. 2. One end of a pivot 40 is rigidly attached to each end of the cross member 34. The other end of this pivot, advantageously stepped down to a smaller diameter, freely rotates in a bore traversing the block 36, as clearly seen in FIG. 2. To prevent the clamping block from sliding off the pivot 40, there is provided a stop screw 42. The free end of the clamping block 36 is provided with a U-shaped recess 43 fitting over the upright 38, to which the block 36 is clampable by means of a thumbscrew 44. A stop, consisting of a stationary pin 45 mounted on the clamping block 36, and a movable pin 46 inserted into the pivot 40 limits the swiveling motion of the cross member 34 relative to the clamping block 36.

As the cross member 34 has a definite length (which also determines the distance between the U-shaped recesses of the blocks 36), it would fit only that size of wheelchair the distance between whose uprights 38 corresponded to this recess distance. A telescoping variant of the cross member 34, shown in FIG. 4 makes the latter adaptable to wheelchairs of different widths. The pivot 40 of one clamping block 36 is provided with a plunger-like extension 47 which telescopically slides inside the tubular cross member 34. Once the distance between the U-shaped recesses 43 has been adjusted to fit a given wheelchair, the screw 48 is tightened.

Further provided is a lug 50 fixedly attached to the cross member 34 and having a hole at its face end. The purpose of this lug 50 will be explained further below.

As seen so far, the attachment according to the invention, when mounted on a wheelchair in the manner explained and illustrated in FIGS. 5 and 6, is capable of swinging, pendulum-like, between a first postion, in which the drive wheel 6 freely rests on, and makes contact with, the ground as seen in FIG. 5, and a second position, or range of second positions, in which the drive wheel 6 is lifted off the ground, as seen in FIG. 6. Clearly, the position illustrated in FIG. 5 is the power-drive position, and that indicated in FIG. 6, the manual-drive position. Since, as already pointed out, the drive wheel 6 rests on the ground by its own weight only (and that of the motor 2, the speed reducer 4, etc., altogether about 3 kg), the question may be asked as to what force provides the necessary ground grip to push a load of 100 kg (user+wheelchair) up a gradient of, say, 10%? The answer to this question is provided by FIG. 7, which illustrates the forces coming into action. P designates the point of suspension, in this case the axis of the cross member 34, $F_T$ the tangential force, parallel to the ground, produced by the drive wheel 6, and resolved into the ground force $F_G$ and the force $F_S$ acting through the suspension point P on the wheelchair. It is seen that, provided the angle is sufficiently large (about 70° gives optimum results), a relatively small tangential force $F_T$ will produce a relatively large force $F_G$ acting into the ground and providing the necessary friction.

Figure 7:
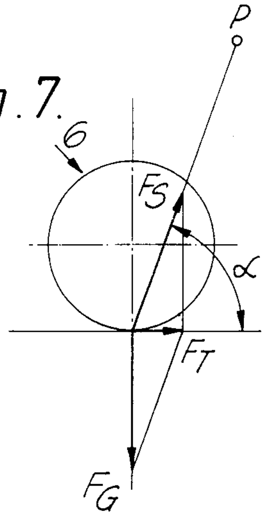
FIG. 7 illustrates the forces acting with the drive according to the invention.

In fact, the force $F_G$ will increase with increasing resistance encountered by the wheelchair, and it is clear from FIG. 7 that if the suspension point P—which can move only together with the chair—is prevented from advancing at the speed of travel of the drive wheel 6, the latter will simply try to "overtake" point P by increasing the angle, thereby increasing the components $F_G$ and $F_S$ even further. An increase of, as is obvious from the geometry of the arrangement, is however possible only by causing point P to rise—in other words, by lifting the rear wheels of the wheelchair off the ground. To prevent such an undesirable situation from arising, the angle must not be permitted to increase beyond a size where it would cause the rear wheels to lose contact with the ground. This is facilitated by a microswitch 128 which, for reasons of convenience and clarity, is shown only in FIG. 9, in conjunction with a second embodiment of the invention, but which is of course also provided in the present embodiment in an analogous position. This microswitch 128, in a manner to be explained with reference to the above-mentioned second embodiment, will cut off the motor 2, the instant angle has exceeded a certain limit. The mechanical stop 45/46 shown in FIG. 2 serves only to prevent excessive swivel in case of, e.g., potholes in the ground.

At this point it should be noted that when the electric motor 2 is stopped while the wheelchair is on a slope, the speed-reducer worm 8, being, as already mentioned, self-locking, will prevent the wheelchair from rolling backwards down the slope.

Transition from the power-drive position illustrated in FIG. 5 (the electric controls for which power drive will be discussed further below) to the manual-drive position of FIG. 6 is effected by a Bowden cable 52 actuatable by means of a lever 54 located within convenient reach of the user. The lower end of the cable 52 is hooked with the aid of, e.g., a detachable snaplink 126 (see FIG. 10) into the hole of the lug 50. In FIG. 5, the Bowden cable 52 is slack, and the drive wheel 6 rests on the ground. In FIG. 6, the lever 54 has been moved, pulling the cable 52 and, via the lug 50, lifting the drive wheel 6 off the ground. The Bowden-cable jacket 56 is attached to the wheelchair at convenient points.

For folding the wheelchair, the entire drive attachment is removed from the wheelchair by unscrewing the thumbscrews 44, unhooking the snaplink 126 from the lug 50 and removing the wire terminals 58 from the motor brushes 60 (FIG. 1).

Further seen in FIGS. 5 and 6 is a steering stick 62 attached to a swiveling member of one of the castor wheels 64, such as its swivel shaft if accessible, or the castor-wheel fork, for steering during power drive, as well as a first pushbutton 66 advantageously located on the steering stick 62, for use of the chair's occupant, and a second pushbutton, 68, located near the pushing handles, for use of an attendant or companion. The electrical leads of the pushbuttons 66 and 68 are not shown. The drive will operate only as long as one of the pushbuttons is pressed.

For longer periods of manual driving, it is often convenient to remove the steering stick 62. To this end, the latter is seated in a socket (not shown) from which it is easily withdrawn together with the pushbutton 66, after unplugging the wire leads. Suitable clips are provided on the wheelchair frame to hold the steering stick 62 when not used.

Further provided is a battery bag 70, advantageously mounted on the backside of the backrest. The 36-V battery itself can be any of the known rechargeable types, e.g., dry lead-acid batteries, or nickel-cadmium batteries.

Figure 8:
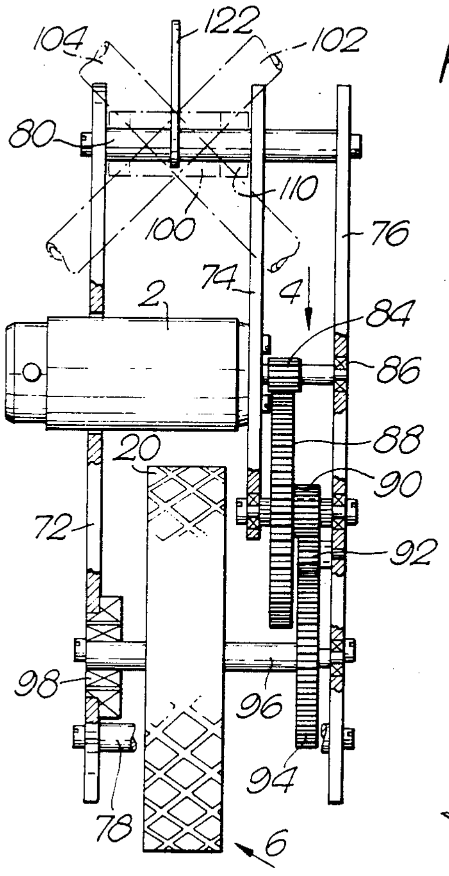
FIG. 8 is a rear view of another embodiment of the attachment according to the invention.
Figure 10:
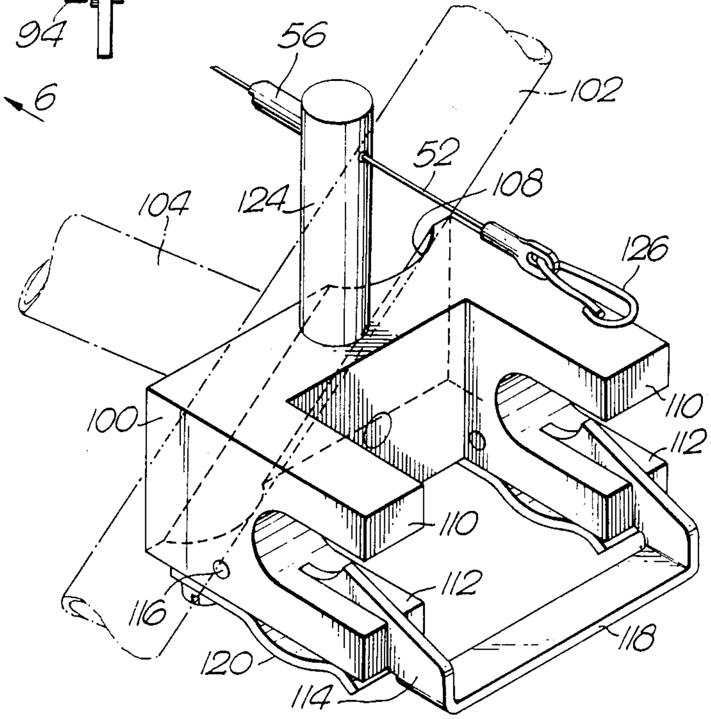
FIG. 10 is a perspective view of the suspension bracket of the embodiment of FIG. 8
Figure 9:
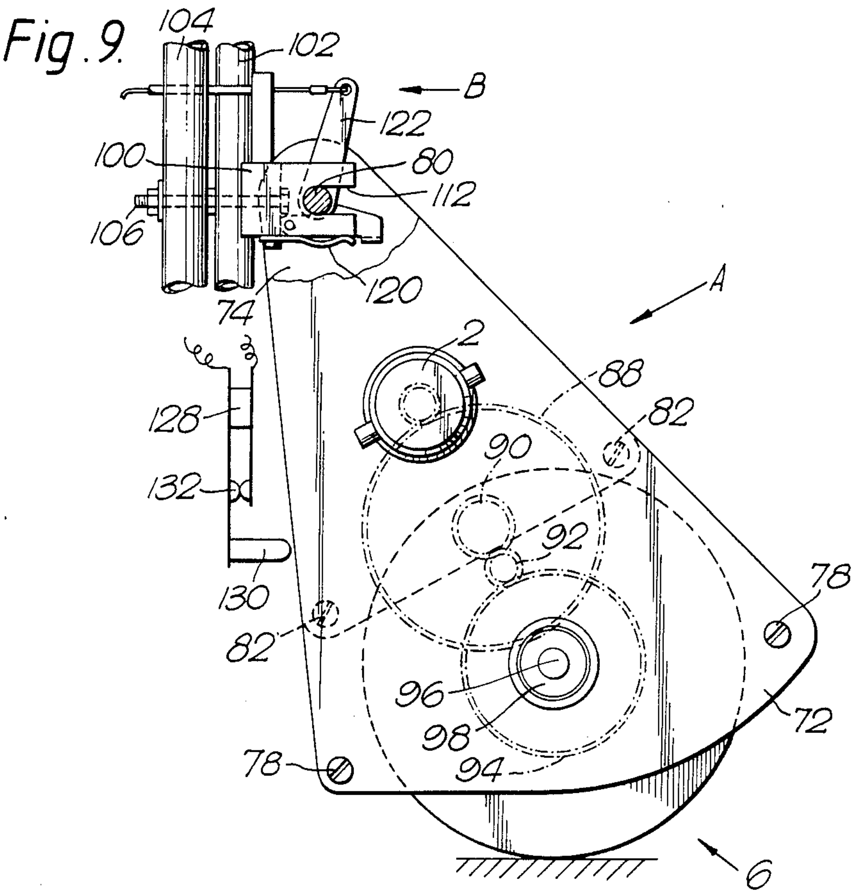
FIG. 9 is a side view of the attachment of FIG. 8 as attached to the scissor struts of a wheelchair.

Another embodiment of the drive attachment according to the invention is illustrated in FIGS. 8 to 10. This embodiment differs from the above described one in two major aspects: its speed reducer 4 is not a worm gear, but a simple spur gear train, and it is attachable not to the two wheelchair uprights 38, but to the scissor-type folding struts characteristic of most wheelchairs.

The attachment proper is shown in FIG. 8 and, in the ground-contacting drive position as attached to the scissor struts, in FIG. 9.

The entire mechanism is mounted between three plates, a left plate 72, an intermediate plate 74 and a right plate 76 which are secured to one another by means of distance pieces 78 (plate 72 to plate 76), 80 (plate 72 to plate 74), and 82 (plate 74 to plate 76). For sake of simplicity, the screw heads in FIG. 9 stand in for the distance pieces otherwise invisible in FIG. 9 and partly hidden in FIG. 8. The arrow A in FIG. 9 indicates the direction in which the attachment is viewed to obtain the view of FIG. 8.

The motor 2 is mounted on the intermediate plate 74, with the first gear pinion 84 fixedly attached to the motor shaft, and supported in a ball bearing 86 mounted in plate 76. Gear pinion 84 meshes with a large gear 88 keyed to a common shaft with a second gear pinion 90. The latter, via an idler gear 92, drives the final gear 94, to the shaft 96 of which is keyed the hub of the drive wheel 6. Total reduction is 1:40.

Although not shown in the drawings, it is advantageous to provide the space between plates 74 and 76 with a suitable casing to protect the gear train 84-94 against dust and soil and other particles.

Another important difference between this and the previous embodiment resides in the fact that, unlike the worm and wormwheel, the gear train 84-94 is not self-locking. Thus, to prevent reversing on a slope when the motor 2 is cut, an overrun clutch 98 is provided, which permits the shaft 96 to rotate in the direction of drive, but blocks it in the opposite direction.

The suspension, best understood from the perspective drawing of FIG. 10, but also shown in FIG. 9, consists of a generally U-shaped bracket 100 permanently attached to the scissor struts 102, 104 by means of a bolt 106 (FIG. 9) which also serves as the swivel axis of these struts. For secure mounting there is advantageously provided a shallow groove 108 into which fits the tubular strut 102. In the two lateral flanges 100 of the U-shaped bracket 100 there are provided U-shaped slots 112 into which fits the distance piece 80, as seen in FIGS. 8 and 9. A spring-loaded catch 114, tiltable about a pivot 116 permits the attachment to be pushed into the slots 112, but snaps over the distance piece 80, to retain the entire attachment in the position indicated in FIG. 9. To release the piece 80, one presses down the bar 118 against the restoring force of the flat spring 120.

To the distance piece 80 which is tightly secured to the plates 72 and 74, there is fixedly attached a lug 122 that, when pulled in direction of arrow B, will cause the drive wheel to be lifted off the ground.

Pulling is effected in the known manner by the Bowden cable 52, held in position by an upright 124 and connectable to the hole at the upper end of the lug 122 by means of a hook or snaplink 126.

The microswitch 128, already mentioned earlier is shown, in schematic representation only, in FIG. 9. This switch is of the normally closed type, and is fixedly attached to a stationary member of the device, for instance the bracket 100 (to which, in the previous embodiment, would correspond one of the clamping blocks 36). The trigger 130 of the switch 128 is meant to be actuated by a swiveling member of the device, say the edge of plate 72. It is clearly seen that any further swivel of the device towards the wheelchair, i.e., any further increase in the angle will cause the contacts 132 to move apart and break the circuit.

Figure 11:
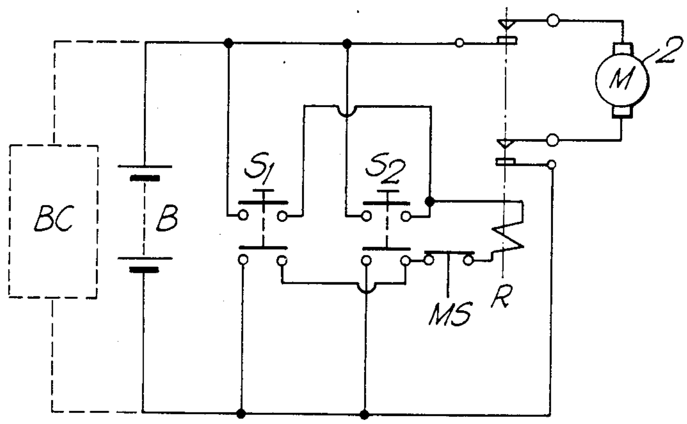
FIG. 11 represents the circuit diagram of the attachment according to the invention.

The circuit diagram shown in FIG. 11 is exceedingly simple and shows the motor M powered by a storage battery B and controlled via a relay R either by the patient's switch $S_1$ (66 in FIG. 5) or the attendant's switch $S_2$ (68 in FIG. 5). Seen is also the microswitch MS (128 in FIG. 9). An optional feature is a battery check BC.

While the suspension illustrated in FIG. 10 was referred to in conjunction with the embodiment of FIGS. 8 and 9, it could also be used with the preferred embodiment of FIGS. 1 to 4. Conversely, the suspension associated with that embodiment could also be adapted for use with the embodiment of FIGS. 8 and 9.

In principle, the overrun clutch 98 (FIGS. 8 and 9) could also be part of the drive wheel 6 which would then be attached not to the final shaft 96, but to the outer member of the overrun clutch 98, while the inner member of this clutch would be fixedly attached to the final shaft 96.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electric drive attachment for a wheelchair, comprising:

- an electric motor constituting the input member of said drive;
- a wheel adapted to touch the ground and to drive said wheelchair by frictional contact with said ground, said wheel constituting the output member of said drive;
- speed-reducing means interposed between said input member and said output member;
- wherein said input member, said speed-reducing means and said output member are mounted on a common mounting member attachable to said wheelchair, means being provided to cause said common mounting member to selectively assume a first position in which said output member is in contact with said ground, and at least one second, non-contact position, in which said output member is lifted off said ground.

2. The device as claimed in claim 1, wherein said common mounting member is attached to at least one structural member of said wheelchair in such a manner as to be tiltable about an axis substantially parallel to the axis of the rear wheels of said wheelchair.

3. The drive as claimed in claim 1, wherein said speed-reducing means is a worm gear comprising a worm and a worm wheel.

4. The drive as claimed in claim 1, wherein said speed-reducing means is a gear train.

5. The drive as claimed in claim 1, further comprising handle-operated cable means, the pulling of which forces said common mounting member to tilt upwardly, causing said output member to assume said second, non-contact position, and the releasing of which permits gravity to tilt said common mounting member downwardly, causing said output member to assume said first, ground-contacting position.

6. The drive attachment as claimed in claim 1, further comprising means to prevent said wheelchair from moving in the reverse direction when said output member is in said first, ground-contacting position.

7. The drive attachment as claimed in claim 6, wherein said means is a free-wheeling clutch the stationary member of which is fixedly attached to said mounting member, and the rotary member of which is fixedly attached to the shaft of said output member.

8. The drive as claimed in claim 1, wherein said electric motor is controlled by a pushbutton located within reach of, and operatable by, the user of said wheelchair.

9. The drive as claimed in claim 1, further comprising a second pushbutton, located within reach of, and operatable by, an attendant.

10. The drive as claimed in claim 1, further comprising a steering member at least temporarily attachable to a swiveling component of a castor wheel of said wheelchair.

11. The drive as claimed in claim 1, further comprising a microswitch adapted to override said pushbuttons and to cut off said electric motor when said downward tilt exceeds a predeterminable limit.

* * * * *